US012263858B2

(12) United States Patent
Katayama et al.

(10) Patent No.: US 12,263,858 B2
(45) Date of Patent: Apr. 1, 2025

(54) DRIVING ASSISTANCE DEVICE, VEHICLE, AND DRIVING ASSISTANCE METHOD

(71) Applicant: HONDA MOTOR CO., LTD., Tokyo (JP)

(72) Inventors: Hirotaka Katayama, Wako (JP); Haruhiko Nishiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 18/111,874

(22) Filed: Feb. 20, 2023

(65) Prior Publication Data

US 2023/0294723 A1 Sep. 21, 2023

(30) Foreign Application Priority Data

Mar. 17, 2022 (JP) .................................. 2022-042369

(51) Int. Cl.
*B60W 50/14* (2020.01)
*B60K 35/00* (2006.01)
*B60K 35/28* (2024.01)
*B60K 35/60* (2024.01)

(52) U.S. Cl.
CPC ............. *B60W 50/14* (2013.01); *B60K 35/00* (2013.01); *B60K 35/28* (2024.01); *B60K 35/60* (2024.01); *B60K 2360/167* (2024.01); *B60K 2360/782* (2024.01); *B60W 2050/143* (2013.01); *B60W 2050/146* (2013.01)

(58) Field of Classification Search
CPC .......... B60W 50/14; B60W 2050/143; B60W 2050/146; B60K 35/00; B60K 35/28
See application file for complete search history.

(56) References Cited

U.S. PATENT DOCUMENTS

| 11,427,212 B2 | 8/2022 | Higashitani et al. |
| 2020/0017115 A1* | 1/2020 | Higashitani .......... G05D 1/0088 |
| 2021/0179138 A1 | 6/2021 | Terazawa et al. |
| 2022/0176911 A1* | 6/2022 | Nayak ................... B60W 50/14 |

FOREIGN PATENT DOCUMENTS

| JP | 2018-177103 A | 11/2018 |
| JP | 2020-038200 A | 3/2020 |
| JP | 2020-055410 A | 4/2020 |

OTHER PUBLICATIONS

Japanese Office Action for Japanese Patent Application No. 2022042369 mailed Jul. 31, 2023 (partially translated).

* cited by examiner

*Primary Examiner* — Benyam Haile
(74) *Attorney, Agent, or Firm* — Thomas | Horstemeyer, LLP

(57) ABSTRACT

A driving assistance device comprises: an information display unit configured to display travel information based on the driving assistance function based on a power supply from a power source mounted on a vehicle having a driving assistance function; an information notification unit provided on a steering wheel of the vehicle and configured to make a notification of an operation state of the driving assistance function by turning on or off; a notification control unit configured to operate based on a power supply from the power source and control the notification based on operation information indicating the operation state of the driving assistance function; and an alarm unit connected to the notification control unit via a communication unit and capable of outputting an alarm based on power of an internal power source different from the power source.

9 Claims, 7 Drawing Sheets

FIG. 2

|  | MANUAL DRIVING MODE | NORMAL SUPPORT MODE | EXTENSION SUPPORT MODE |
|---|---|---|---|
| ACC | × | ○ | ○ (with map) |
| ACC + LKAS | × | ○ | ○ (with map) |
| ALC | × | × | ○ (with map) |
| ALCA | × | × | ○ (with map) |

DRIVING ASSISTANCE DEVICE, VEHICLE, AND DRIVING ASSISTANCE METHOD

CROSS-REFERENCE TO RELATED APPLICATION(S)

This application claims priority to and the benefit of Japanese Patent Application No. 2022-042369 filed on Mar. 17, 2022, the entire disclosure of which is incorporated herein by reference.

BACKGROUND OF THE INVENTION

Field of the Invention

The present invention relates to a driving assistance device, a vehicle, and a driving assistance method.

Description of the Related Art

Japanese Patent Laid-Open No. 2020-038200 discloses a vehicle control technique in which, in a vehicle control apparatus having a plurality of automation levels, authority is transferred to an occupant in a driver's seat when it is difficult to continue operation of vehicle control at a predetermined automation level.

In a vehicle capable of performing driving assistance by switching a plurality of driving assistance functions, it is necessary to smoothly transfer authority related to vehicle control and surrounding monitoring between a vehicle system and a driver. For example, even in a situation where the power supply from the power source mounted on the vehicle is stopped, it is desirable to have a function capable of notifying the driver of the transfer of authority regardless of the power supplied from the power source.

An object of the present invention is to suppress a decrease in smoothness of traffic while improving safety of traffic, and, specifically, provide a driving assistance technique capable of notifying a driver of transfer of authority related to vehicle control and surrounding monitoring even in a situation where the power supply from a vehicle power source mounted on a vehicle is stopped.

SUMMARY OF THE INVENTION

According to one aspect of the present invention, there is provided a driving assistance device of a vehicle having a driving assistance function, the driving assistance device comprising: an information display unit configured to display travel information based on the driving assistance function based on a power supply from a power source mounted on the vehicle; an information notification unit provided on a steering wheel of the vehicle and configured to make a notification of an operation state of the driving assistance function by turning on or off; a notification control unit configured to operate based on a power supply from the power source and control the notification based on operation information indicating the operation state of the driving assistance function; and an alarm unit connected to the notification control unit via a communication unit and capable of outputting an alarm based on power of an internal power source different from the power source, wherein when a power supply from the power source is stopped, the alarm unit outputs the alarm based on the power of the internal power source.

According to another aspect of the present invention, there is provided a driving assistance method of a vehicle having a driving assistance function, the method comprising: displaying travel information based on the driving assistance function based on a power supply from a power source mounted on the vehicle; making a notification of an operation state of the driving assistance function by turning on or off; operating based on a power supply from the power source and controlling the notification based on operation information indicating an operation state of the driving assistance function; outputting an alarm based on power of an internal power source different from the power source; and when a power supply from the power source is stopped, outputting the alarm based on the power of the internal power source.

BRIEF DESCRIPTION OF THE DRAWINGS

FIG. 2 is a diagram illustrating a state transition in a driving assistance function.

DESCRIPTION OF THE EMBODIMENTS

Figure 1:
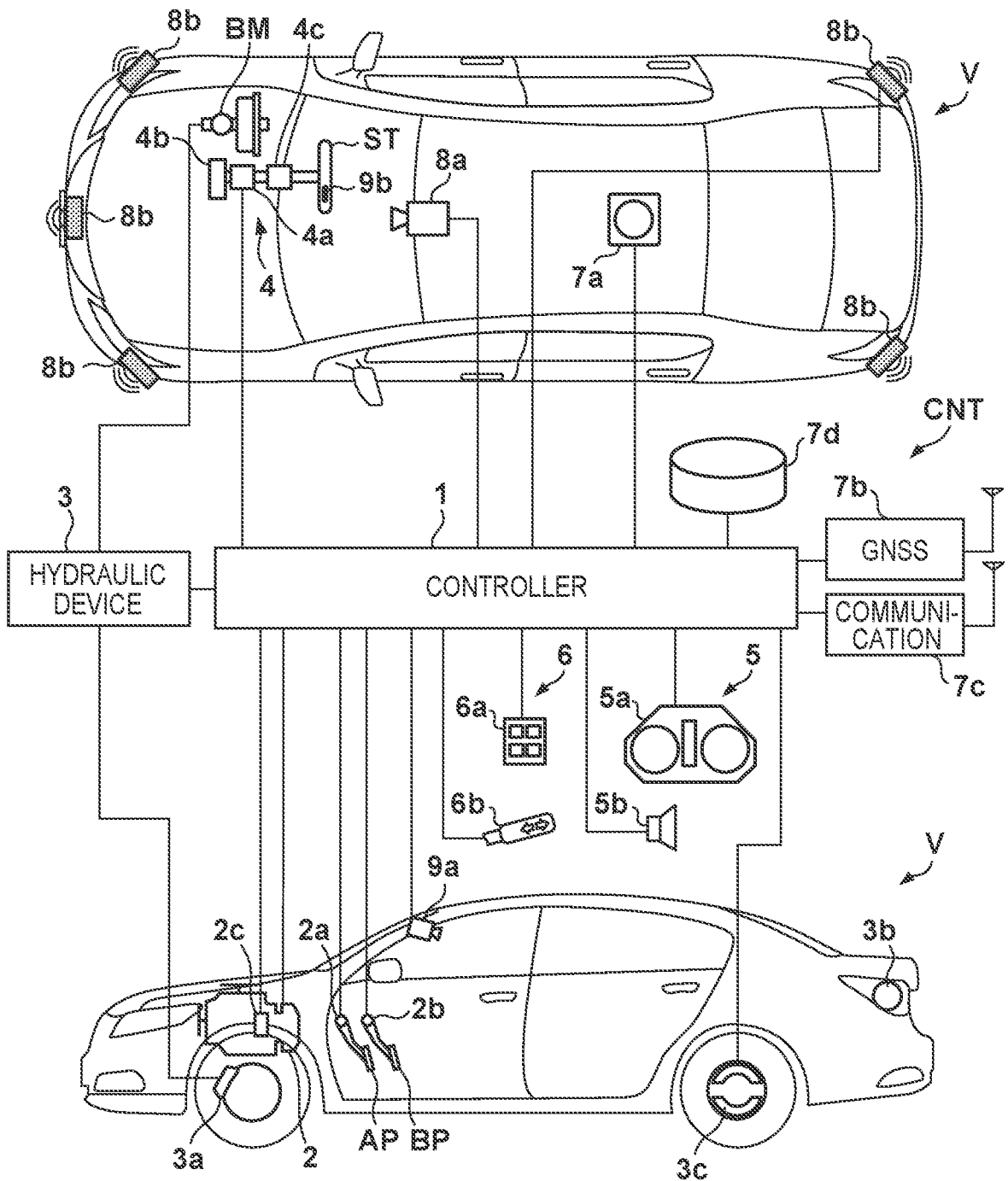
FIG. 1 is a block diagram of a vehicle and a control apparatus according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

An embodiment according to the present invention will be described. FIG. 1 is a block diagram of a vehicle V and a control apparatus CNT thereof according to the present embodiment. In FIG. 1, an outline of the vehicle V is illustrated in plan view and in a side view. The vehicle V in the present embodiment is, as an example, a sedan-type four-wheeled passenger vehicle, and may be, for example, a parallel hybrid vehicle. Note that the vehicle V is not limited to the four-wheeled passenger vehicle, and may be a straddle type vehicle (motorcycle or three-wheeled vehicle) or a large-sized vehicle such as a truck or a bus.

[Configuration of Vehicle Control Apparatus]

The control apparatus CNT includes a controller 1 that is an electronic circuit that performs control of the vehicle V including driving assistance of the vehicle V. The controller 1 includes a plurality of electronic control units (ECUs). The ECU is provided for each function of the control apparatus CNT, for example. Each ECU includes a processor represented by a central processing unit (CPU), a storage device such as a semiconductor memory, an interface with an external device, and the like. The storage device stores a program to be executed by the processor, data to be used for processing by the processor, and the like. The interface unit includes an input/output interface and a communication interface. Each ECU may include a plurality of processors, a plurality of storage devices, and a plurality of interfaces.

The controller 1 controls driving (acceleration) of the vehicle V by controlling the power unit (power plant) 2. The power unit 2 is a travel driving unit that outputs a driving force for rotating driving wheels of the vehicle V, and can include an internal combustion engine, a motor, and an automatic transmission. The motor can be used as a driving source for accelerating the vehicle V, and can also be used as a generator at the time of deceleration or the like (regenerative braking).

In the case of the present embodiment, the controller 1 controls an output of the internal combustion engine or the motor, or switches a gear ratio of the automatic transmission in accordance with the driver's driving operation, the vehicle speed, and the like that have been detected by an operation detection sensor 2a provided in an accelerator pedal AP and an operation detection sensor 2b provided in a brake pedal BP. Note that the automatic transmission includes a rotation speed sensor 2c, which detects the rotation speed of an output shaft of the automatic transmission, as a sensor that detects a traveling state of the vehicle V. It is possible to calculate the vehicle speed of the vehicle V from a result of detection by the rotation speed sensor 2c.

The controller 1 controls braking (deceleration) of the vehicle V by controlling a hydraulic device 3. The driver's braking operation on a brake pedal BP is converted into hydraulic pressure in a brake master cylinder BM, and is transmitted to the hydraulic device 3. The hydraulic device 3 is an actuator capable of controlling, based on the hydraulic pressure transmitted from a brake master cylinder BM, the hydraulic pressure of hydraulic oil supplied to a brake device 3a (for example, a disc brake device) provided on each of the four wheels.

The controller 1 can control braking of the vehicle V by performing drive control of an electromagnetic valve or the like included in the hydraulic device 3. The controller 1 can include an electric servo brake system by controlling the distribution of the braking force by the brake device 3a and the braking force by the regenerative braking of the motor included in the power unit 2. The controller 1 may turn on a brake lamp 3b at the time of braking.

The controller 1 controls the steering of the vehicle V by controlling an electric power steering device 4. The electric power steering device 4 includes a mechanism that steers front wheels in response to a driver's driving operation (steering operation) on a steering wheel ST. The electric power steering device 4 includes a driving unit 4a including a motor that exerts driving force for assisting the steering operation or automatically steering the front wheels (referred to as steering assist torque in some cases), a steering angle sensor 4b, a torque sensor 4c that detects steering torque burdened by the driver (referred to as steering burden torque to be distinguished from steering assist torque), and the like.

The controller 1 controls an electric parking brake device 3c provided on the rear wheel. The electric parking brake device 3c include a mechanism for locking the rear wheel. The controller 1 is capable of controlling locking and unlocking of the rear wheels by the electric parking brake devices 3c.

The controller 1 controls an information output device 5 that notifies the inside of the vehicle of information. The information output device 5 includes, for example, an information display device 5a that notifies (displays) the driver of information by an image, and/or an audio output device 5b that notifies the driver of information by a voice. The information display device 5a can be provided on, for example, an instrument panel or a steering wheel ST. The information display device 5a may be a head-up display. The information output device 5 may notify the occupant of information by vibration or light. In addition, the controller 1 receives an instruction input from an occupant (for example, a driver) via an input device 6. The input device 6 is disposed at a position operable by the driver, and includes, for example, a switch group 6a with which the driver instructs the vehicle V and/or a blinker lever 6b for operating a direction indicator (blinker).

The controller 1 recognizes and determines a current position and a course (attitude) of the vehicle V. In the case of the present embodiment, the vehicle V is provided with a gyro sensor 7a, a global navigation satellite system (GNSS) sensor 7b, and a communication device 7c. The gyro sensor 7a detects a rotation motion (yaw rate) of the vehicle V. The GNSS sensor 7b detects a current position of the vehicle V. In addition, the communication device 7c performs wireless communication with a server that provides map information and traffic information, and acquires these pieces of information. In the case of the present embodiment, the controller 1 determines the course of the vehicle V based on the results of detection by the gyro sensor 7a and the GNSS sensor 7b, sequentially acquires highly accurate map (high-definition map) information about the course from the server via the communication device 7c, and stores the map information in a database 7d (storage device). Note that the vehicle V may be provided with sensors that detect the state of the vehicle V, such as a speed sensor that detects the speed of the vehicle V or an acceleration sensor that detects the acceleration of the vehicle V.

The controller 1 performs driving assistance of the vehicle V based on the results of detection by various detection units provided in the vehicle V. The vehicle V is provided with surroundings detection units 8a to 8b, which are external sensors that detect the outside (surrounding situation) of the vehicle V, and vehicle interior detection units 9a to 9b, which are in-vehicle sensors that detect the situation inside the vehicle (the state of the driver). The controller 1 can grasp the surrounding situation of the vehicle V based on the results of detection by the surroundings detection units 8a to 8b, and perform driving assistance according to the surrounding situation. In addition, the controller 1 can determine whether the driver is performing a predetermined operation obligation imposed on the driver when performing driving assistance based on the results of detection by the vehicle interior detection units 9a to 9b.

The surroundings detection unit 8a is an imaging device that captures an image ahead of the vehicle V (hereinafter, it may be referred to as a front camera 8a), and is attached to the vehicle interior of the windshield at the front of the roof of the vehicle V, for example. The controller 1 can extract a contour of a target or a lane marking (such as a white line) on a road by analyzing an image captured by front camera 8a.

A surroundings detection unit 8b is a millimeter wave radar (hereinafter, may be referred to as the radar 8b), detects a target around the vehicle V by use of radio waves, and detects (measures) a distance to the target and a direction (azimuth) of the target with respect to the vehicle V. In the example illustrated in FIG. 1, five radars 8b are provided, including one at the center of the front part of the vehicle V, one at each of the right and left corner portions of the front part of the vehicle V, and one at each of the right and left corner portions of the rear part of the vehicle V.

Note that the surroundings detection unit provided in the vehicle V is not limited to the above configuration, and the number of cameras and the number of radars may be changed, and a light detection and ranging (LiDAR) for detecting a target around the vehicle V may be provided.

The vehicle interior detection unit 9a is an imaging device that captures an image of the inside of the vehicle (hereinafter, it may be referred to as an in-vehicle camera 9a), and is attached to, for example, the vehicle interior at the front part of the roof of the vehicle interior V. In the case of the present embodiment, the in-vehicle camera 9a is a driver monitoring camera that captures an image of a driver (for example, eyes and a face of the driver). The controller 1 can determine the directions of the line of sight and the face of the driver by analyzing an image (a face image of the driver) captured by the in-vehicle camera 9a.

The vehicle interior detection unit 9b is a grip sensor that detects grip of the steering wheel ST by the driver (hereinafter, it may be referred to as a grip sensor 9b), and is provided in at least part of the steering wheel ST, for example. An example of the vehicle interior detection unit may include a torque sensor 4c that detects the steering torque of the driver.

Examples of the driving assistance of the vehicle V include acceleration/deceleration assistance, lane keeping assistance, and lane change assistance. The acceleration/deceleration assistance is driving assistance (adaptive cruise control (ACC)) that controls acceleration/deceleration of the vehicle V within a predetermined vehicle speed while maintaining an inter-vehicle distance from a preceding vehicle by controlling the power unit 2 and the hydraulic device 3. The lane keeping assistance is driving assistance (lane keeping assist system (LKAS)) that controls the electric power steering device 4 to keep the vehicle V inside the lane. The lane change assistance is driving assistance (advanced lane change (ALC), active lane change assist (ALCA)) for changing the traveling lane of the vehicle V to the adjacent lane by controlling the electric power steering device 4. In addition, the driving assistance performed by the controller 1 may include a collision reduction brake for assisting collision avoidance with a target (for example, a pedestrian, another vehicle, or an obstacle) on the road by controlling the hydraulic device 3, an ABS function, traction control, and/or posture control of the vehicle V.

The driving assistance (acceleration/deceleration assistance, lane keeping assistance, lane change assistance) of the vehicle V is performed in a plurality of modes including a manual driving mode, a normal assistance mode, and an extended assistance mode. FIG. 2 illustrates driving assistance performed in each of the manual driving mode, the normal driving mode, and the extended driving mode of the present embodiment. In the manual driving mode, the acceleration/deceleration assistance, the lane keeping assistance, and the lane change assistance are not performed, and manual driving of the vehicle V is performed by the driver.

In the manual driving mode, when an instruction to set the acceleration/deceleration assistance (ACC) is input by the driver via the input device 6 (for example, the switch group 6a), the acceleration/deceleration assistance is started, and the manual driving mode is shifted to the normal assistance mode. In the normal assistance mode, the lane keeping assistance (LKAS) can be performed in addition to the acceleration/deceleration assistance. The lane keeping assistance is started when an instruction to set the lane keeping assistance is input by the driver via the input device 6 (for example, the switch group 6a) during the setting of the acceleration/deceleration assistance. The acceleration/deceleration assistance and the lane keeping assistance end when an instruction to cancel the setting is input by the driver via the input device 6 (for example, the switch group 6a).

In the normal assistance mode, the driver is required to perform predetermined operation obligations such as surrounding monitoring and steering wheel gripping. When it is determined, based on the result of detection by the vehicle interior detection unit 9b, that the driver does not perform the predetermined operation obligation, a notification to prompt the driver to perform the predetermined operation obligation is made via the information output device 5.

When traveling on a specific road is started during execution of the normal assistance mode, highly accurate map information is acquired by a communication device 6c. Then, when the matching between the highly accurate map information and the image captured by the front camera 8a is successful, the normal assistance mode automatically transitions to the extended assistance mode. The specific road is a road that provides highly accurate map information and examples thereof include an expressway and an automobile exclusive road. The highly accurate map information includes, in addition to normal information such as a route and a position of the specific road, information related to a detailed shape of the specific road such as presence or absence and a curvature of a curve, an increase or decrease in a lane, and a gradient of the specific road. When the normal assistance mode is shifted to the extended assistance mode, an information notification device 31 makes a notification indicating that the mode is shifted to the extended assistance mode, for example, by changing a light emission color or turning on or off the light of the information notification device 31 provided in the steering wheel ST. In the present embodiment, the travel environment in a specific road is described as an example of the traveling scene of the vehicle V, but the present invention is not limited to this example, and can be applied to a travel environment in which highly accurate map information is not provided. For example, instead of the map information, image information such as a past travel history of the vehicle V can be used. For example, when matching between image information such as a past travel history and an image captured by the front camera 8a is successful, it is possible to provide driving assistance in the extended assistance mode in a travel environment where highly accurate map information is not provided. As a result, even in a travel environment in which highly accurate map information is not provided, it is possible to provide driving assistance in the extended assistance mode as in a specific road.

In the extended assistance mode, the acceleration/deceleration assistance (and lane keeping assistance) in cooperation with highly accurate map information is performed. For example, based on highly accurate map information, the controller 1 can perform more advanced acceleration/deceleration assistance than that in the normal assistance mode, such as decelerating the vehicle V before a curve or before a point where a lane decreases, or adjusting the speed of the vehicle V according to the curvature of the curve. As in the normal assistance mode, the driver is required to perform predetermined operation obligations such as surrounding monitoring and steering wheel gripping in the extended assistance mode. When it is determined, based on the result of detection by the vehicle interior detection unit 9b, that the driver does not perform the predetermined operation obligation, a notification to prompt the driver to perform the predetermined operation obligation is made via the information output device 5.

In addition, in the extended assistance mode, the lane change assistance can be further performed. In the case of the present embodiment, the lane change assistance includes system-initiated lane change assistance (advanced lane change (ALC)) that automatically changes the lane based on the determination by the controller 1, and driver-initiated lane change assistance (active lane change assist (ALCA)) that automatically changes the lane based on an instruction input from the driver. Note that, in both the system-initiated lane change assistance (ALC) and the driver-initiated lane change assistance (ALCA), when performing the lane change assistance, the driver is required to perform predetermined operation obligations such as surrounding monitoring and steering wheel gripping.

The system-initiated lane change assistance (ALC) is started when an instruction to set the ALC in the extended assistance mode is input by the driver via the input device 6 (for example, the switch group 6a). During the ALC setting, the controller 1 sequentially determines, based on highly accurate map information (information such as increase/decrease in or branching of a lane), whether it is necessary to perform a lane change in order to arrive at a destination set in advance by the driver, and automatically performs the lane change when determining that it is necessary to perform the lane change. During the ALC setting, one or more lane changes can be performed according to the determination by the controller 1. The ALC ends when the vehicle arrives at the destination or when the specific road ends. The ALC may end in a case where an instruction to cancel the setting is input by the driver via the input device 6 (for example, the switch group 6a).

The driver-initiated lane change (ALCA) is performed once in response to an instruction input by the driver, and is performed when an instruction to instruct execution of ALCA in the extended assistance mode is input by the driver via the input device 6 (for example, a direction indicator lever 6b). In the ALCA, a driver can input an instruction of a direction in which a lane change is to be performed via the input device 6 (direction indicator lever 6b), and the controller 1 automatically performs a lane change to an adjacent lane in the direction in which the instruction is input by the driver. In the present embodiment, the ALCA can be performed based on highly accurate map information, but the present invention is not limited thereto, and may be performed without using highly accurate map information. The ALCA can also be performed during the setting of the system-initiated lane change assistance (ALC).

Figure 3:
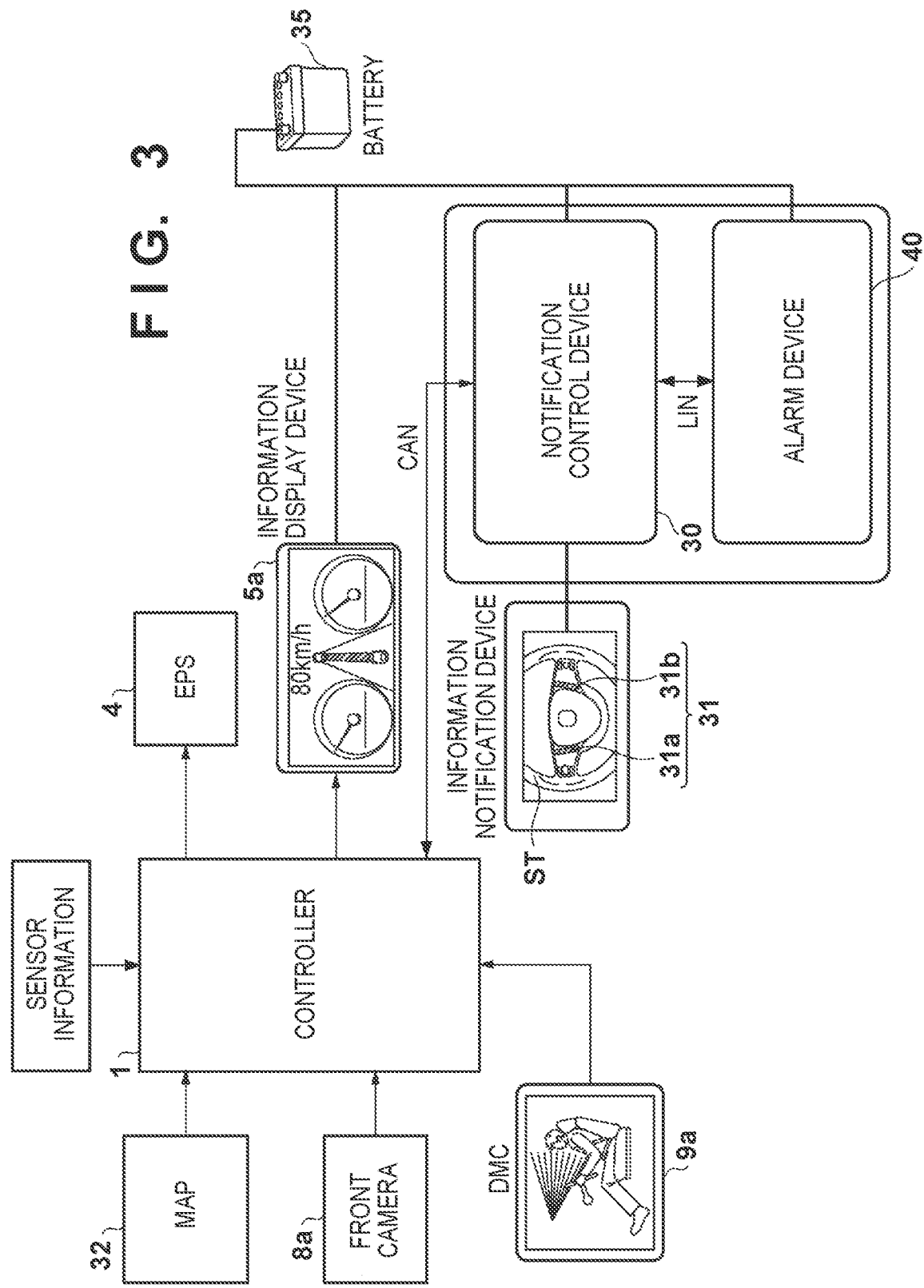
FIG. 3 is a diagram illustrating a system configuration including an alarm device.
Figure 4:
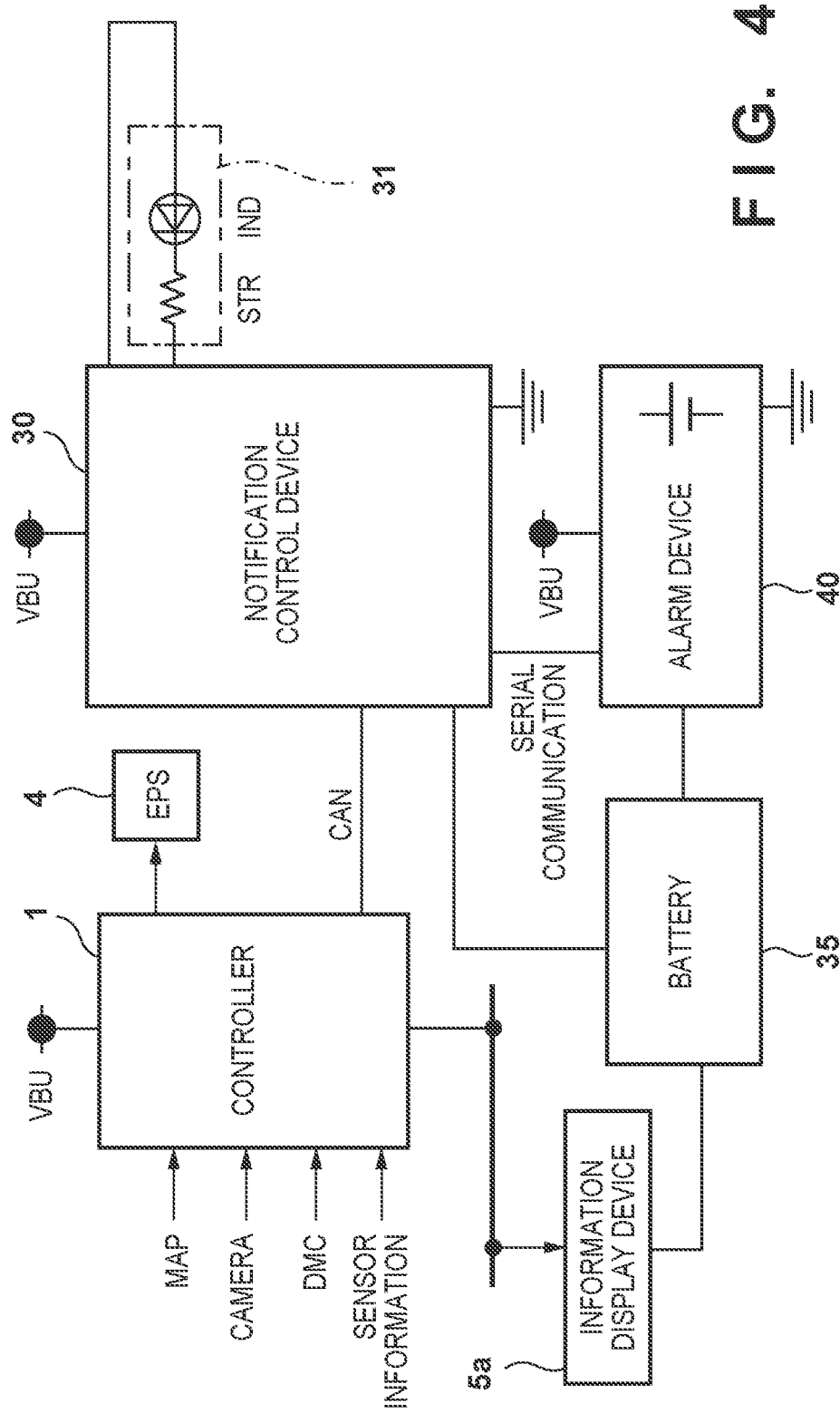
FIG. 4 is a diagram illustrating an electrical connection of the system configuration of FIG. 3.
Figure 5:
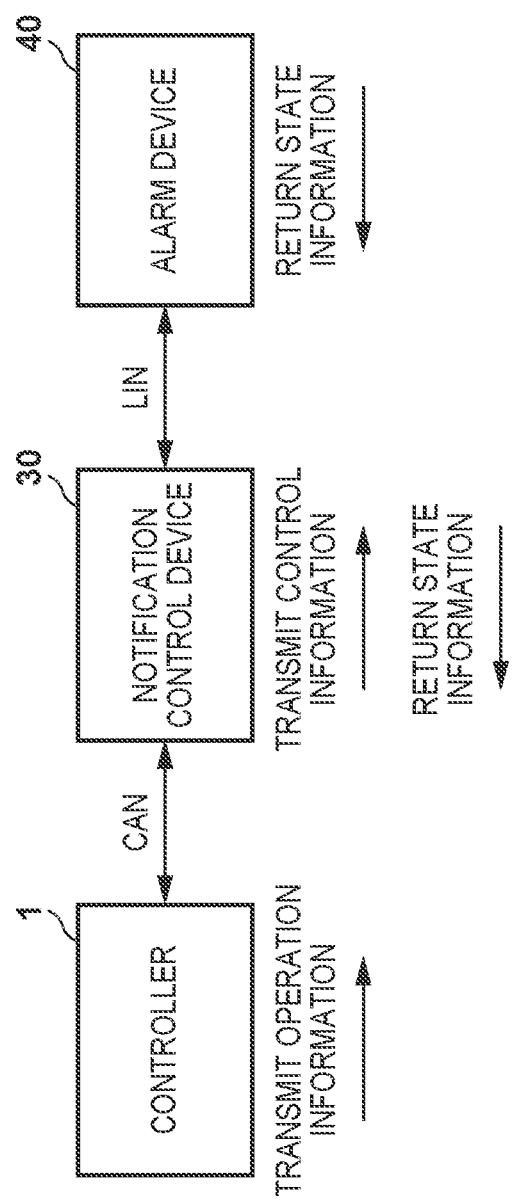
FIG. 5 is a diagram for explaining communication between a controller and a display control unit and communication between the display control unit and an alarm device.

FIG. 3 is a diagram illustrating a system configuration including an alarm device 40. FIG. 4 is a diagram illustrating an electrical connection of the system configuration of FIG. 3. FIG. 5 is a diagram for explaining communication between the controller 1 and a notification control device 30 and communication between the notification control device 30 and the alarm device 40.

As illustrated in FIGS. 3 and 4, the controller 1 receives information 32 (MAP) of the highly accurate map, information obtained by imaging an image by the front camera 8a that captures an image ahead of vehicle V, information acquired by the in-vehicle camera 9a (driver monitoring camera: DMC), and information detected by various sensors (sensor information).

Here, the various sensors may include the operation detection sensor 2a provided on the accelerator pedal AP, the operation detection sensor 2b provided on the brake pedal BP, the rotation speed sensor 2c that detects the rotation speed of the output shaft of the automatic transmission, and the like described in FIG. 1. In addition, the various sensors include the steering angle sensor 4b, the torque sensor 4c, the gyro sensor 7a, the GNSS sensor 7b, a speed sensor, an acceleration sensor, and the surroundings detection unit 8b. Information detected by various sensors is also referred to as sensor information.

The controller 1 responsible for the driving assistance function controls the output of the internal combustion engine and the motor, the braking force of the brake device 3a, and the operation of the electric power steering device 4 (EPS) based on input information 32 about the highly accurate map, information about the front camera 8a, information about the in-vehicle camera 9a, and sensor information to perform the driving assistance control according to the travel environment of the vehicle V.

The information display device 5a is provided on an instrument panel of the vehicle V according to the embodiment, and displays, to a driver, information about a traveling state of the vehicle V and information about a surrounding environment in which the vehicle V (self-vehicle) travels based on information acquired from the controller 1. A battery 35 (power source: battery) supplies power to various kinds of devices of the vehicle V. The information display device 5a displays the travel information based on the driving assistance function based on the power supply from the battery 35.

The steering wheel ST is provided with steering indicators 31a and 31b that make a notification of (display) an operation state of the driving assistance function (extended assistance function) by turning on or off. Hereinafter, the steering indicators 31a and 31b are also referred to as the information notification device 31 (STR IND).

The notification control device 30 (STR IND UNIT) operates based on the power supply from the battery 35, and controls notification (display) of the information notification device 31 based on operation information indicating an operation state of the driving assistance function.

As illustrated in FIG. 5, the notification control device 30 and the controller 1 are connected by a controller area network (CAN) as a first communication network.

The notification control device 30 is capable of communicating with the controller 1 via the CAN, and controls turning on or off of the information notification device 31 (steering indicators 31a and 31b) based on the operation information indicating the operation state of the driving assistance function (extended assistance mode) of the vehicle V received from the controller 1.

Here, the operation information may include sensor information input to the controller 1 in addition to information for distinguishing the extended assistance mode from the normal assistance mode. Furthermore, the CAN used for mutual communication between the controller 1 and the notification control device 30 may include a CAN with flexible data rate (CANFD).

The information notification device 31 (steering indicators 31a and 31b) is turned on when the driving assistance function (extended assistance mode) is activated, and the information notification device 31 (steering indicators 31a and 31b) is turned off when the driving assistance function (extended assistance mode) is not activated. The notification control device 30 displays the information notification device 31 (steering indicators 31a and 31b) based on the power supply from the battery 35. When the power supply from the battery 35 is stopped, the information display device 5a turns off the display of the travel information, and the information notification device 31 turns off the notification.

The notification control device 30 and the alarm device 40 are connected by a local interconnect network (LIN) as a second communication network.

The alarm device 40 is mutually communicable with the notification control device 30 via the LIN. The notification control device 30 transmits the control information to the alarm device 40. Here, the control information includes at least one of a request for a power state of an internal power source 65, a request for state information indicating whether an alarm is output from the alarm device 40 (siren state request information), an alarm output start instruction, an alarm stop instruction, sensor information including vehicle speed information, operation information indicating an operation state of the driving assistance function, and alarm instruction information for operating the alarm device 40 when the power supply from the battery 35 is stopped. The notification control device 30 outputs control information including operation information acquired from the controller 1 to the alarm device 40.

The alarm device 40 has the internal power source 65 and returns state information (Tx) in response to reception of the control information (Rx). Here, the state information includes an output state of an alarm of the alarm device 40 and an internal power source state indicating power that can be output from the internal power source 65.

The notification control device 30 transmits the internal power source state included in the state information acquired from the alarm device 40 to the controller 1, and the controller 1 determines whether to provide the driving assistance function based on the internal power source state.

(Configuration of Alarm Device 40)

Figure 6:
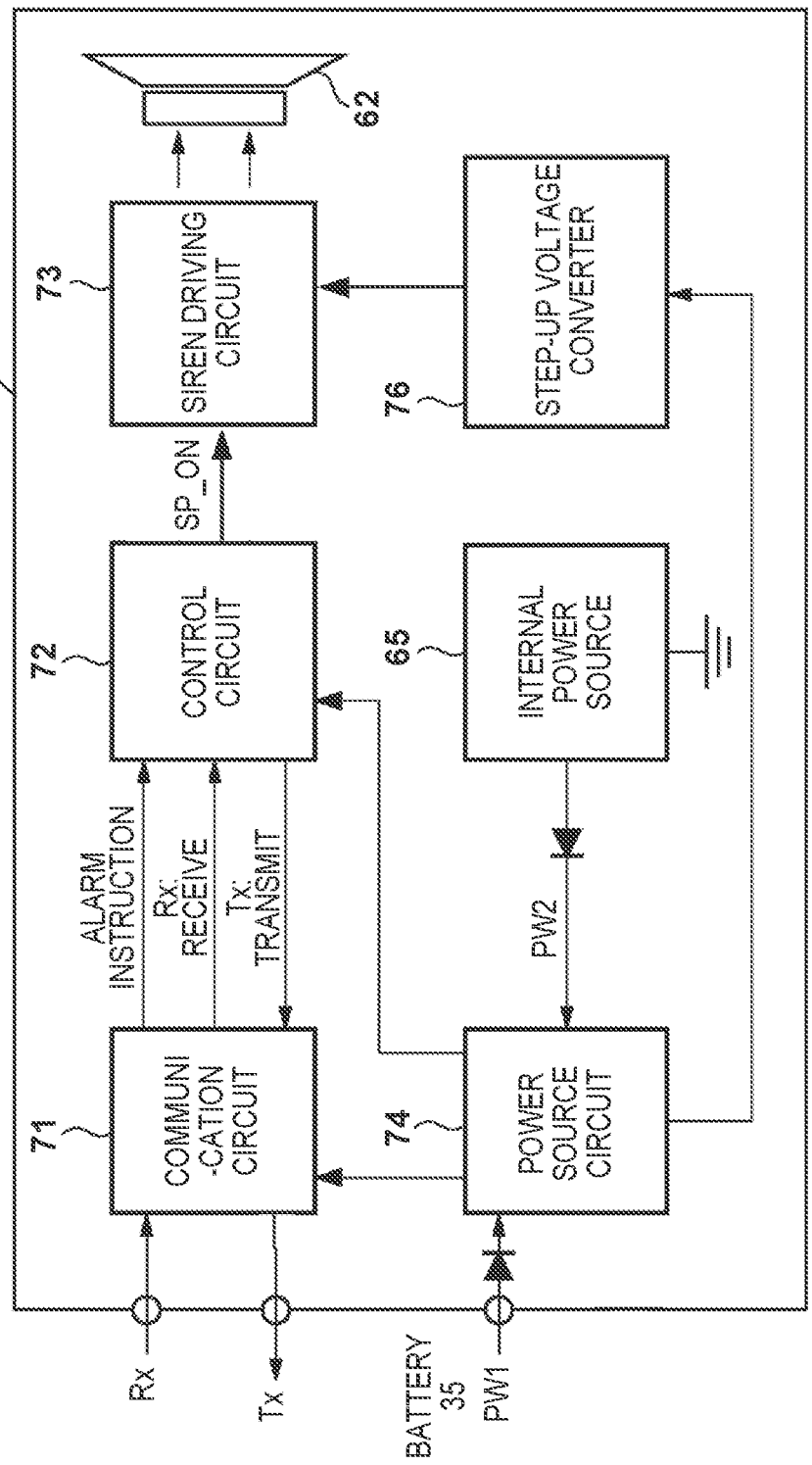
FIG. 6 is a diagram illustrating an electrical connection of components of an alarm device.
Figure 7:
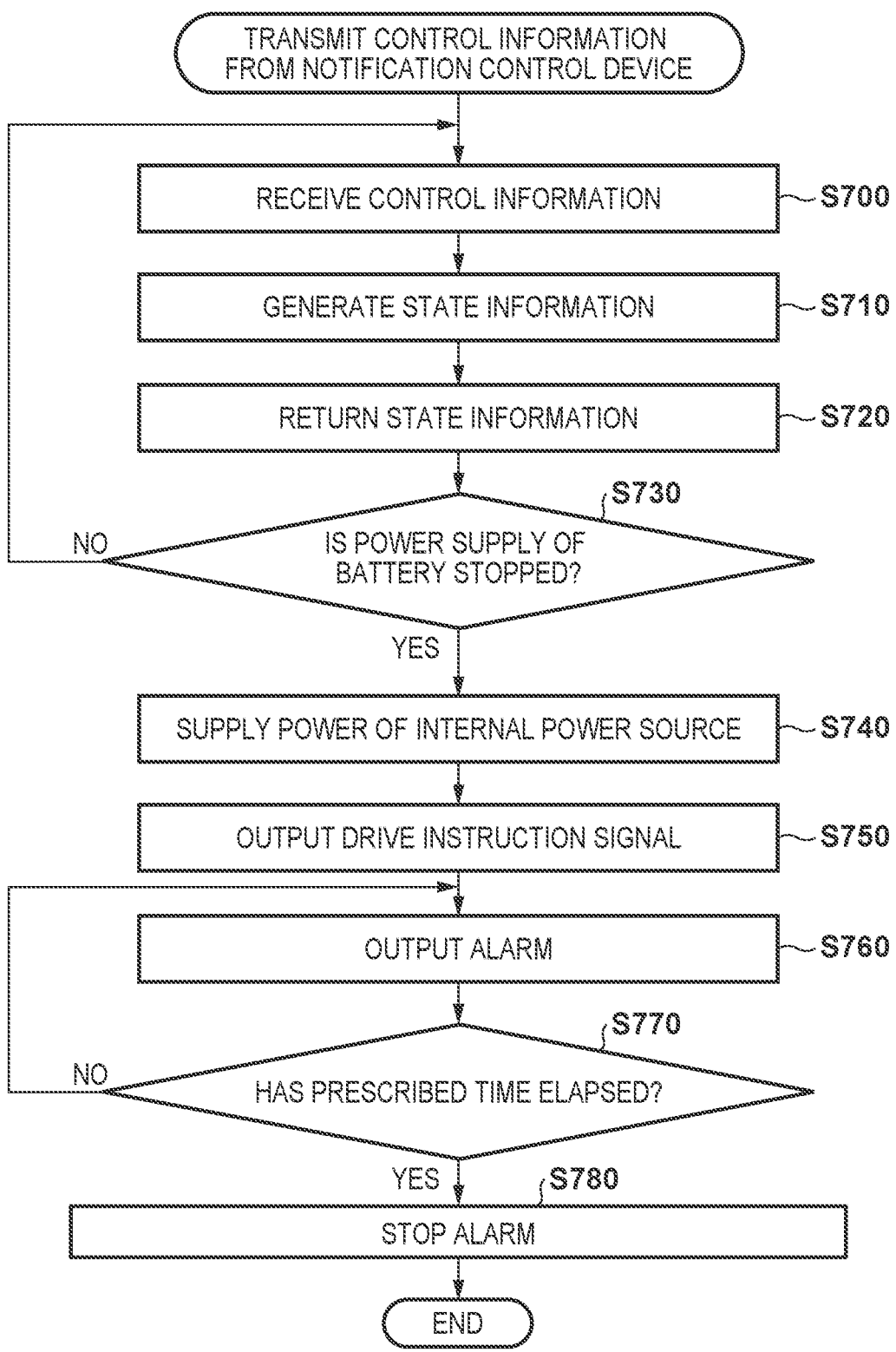
FIG. 7 is a diagram for explaining a flow of processing of an alarm device.

FIG. 6 is a diagram illustrating electrical connection of components of the alarm device 40, and FIG. 7 is a diagram for explaining a flow of processing of the alarm device 40.

The alarm device 40 has a case and a cover covering the case as an exterior of the housing, and the internal power source 65 is attached to the case. The internal power source 65 has a plurality of cells each made of, for example, a lithium (Li) ion battery as a battery cell. For the internal power source 65, a sodium ion secondary battery or a potassium ion secondary battery other than the lithium (Li) ion battery can be used as a cell of the internal power source 65.

A communication circuit 71, a control circuit 72, a siren driving circuit 73, a power source circuit 74, and a step-up voltage converter 76 are mounted on the circuit board inside the alarm device 40.

Here, the communication circuit 71 functions as a communication interface and can communicate with the notification control device 30 via the LIN. The communication circuit 71 outputs the control signal (Rx: reception) received from the notification control device 30 to the control circuit 72 (step S700). In addition, the communication circuit 71 outputs alarm instruction information included in the received control information to the control circuit 72. The alarm instruction information is a signal for operating the alarm device 40 when the power supply from the battery 35 is stopped. An alarm is output by an operation of the alarm device 40.

The control circuit 72 is a circuit that controls the overall operation of the alarm device 40, and monitors the charge state of the internal power source 65 via the power source circuit 74. In addition, the control circuit 72 generates state information (Tx) corresponding to the control information (Rx) (step S710) to output the state information (Tx) to the communication circuit 71. Here, for the state information (Tx) generated by the control circuit 72, the state information includes an output state of an alarm of the alarm device 40 and an internal power source state indicating power that can be output from the internal power source 65.

The alarm device 40 is connected to the battery 35, and the power source circuit 74 functions as a power source interface. The power source circuit 74 supplies the power (PW1) received from the battery 35 to the communication circuit 71 and the control circuit 72.

In a state where power (PW1) is normally supplied from the battery 35, the control circuit 72 generates state information (Tx) corresponding to the control information (Rx) based on the power (PW1) of the battery 35 to output the state information (Tx) to the communication circuit 71.

In addition, in a state where the electric power (PW1) is normally supplied from the battery 35, the communication circuit 71 performs a reception process (step S700) of the control information (Rx), and outputs (returns) the state information (Tx) acquired from the control circuit 72 to the notification control device 30 (step S720).

In a state where the electric power (PW1) is normally supplied from the battery 35 (NO in step S730), the communication circuit 71 and the control circuit 72 operate based on the electric power (PW1), and repeat the processing of steps S700 to S720.

On the other hand, when the power supply from the battery 35 is stopped (YES in step S730), the power source circuit 74 switches the power source from the battery 35 to the internal power source 65. The power source circuit 74 supplies the power (PW2) received from the internal power source 65 to the control circuit 72 and the step-up voltage converter 76 (step S740).

The step-up voltage converter 76 generates a predetermined voltage based on the power (PW2) of the internal power source 65 to output the voltage to the siren driving circuit 73.

When the power supply from the battery 35 is stopped (YES in step S730), the control circuit 72 outputs a drive instruction signal (SP_ON) for driving a piezo speaker 62 to the siren driving circuit 73 based on the alarm instruction information (step S750).

When receiving the drive instruction signal (SP_ON) from the control circuit 72, the siren driving circuit 73 drives the piezo speaker 62 based on a predetermined output voltage from the step-up voltage converter 76.

The piezo speaker 62 is electrically connected to the siren driving circuit 73 to output a predetermined alarm based on a signal from the siren driving circuit 73 (step S760).

The alarm device 40 of the present embodiment communicates with the notification control device 30 via the LIN based on the power supply from the battery 35 (power source) to output an alarm based on the power of the internal power source 65 when the power supply from the battery 35 (power source) is stopped. The alarm device 40 issues an alarm by outputting a notification sound.

In a state in which the battery 35 stops the power supply to each part of the vehicle V, the alarm device 40 outputs a predetermined alarm from the piezo speaker 62 by the power (PW2) of the internal power source 65 to notify the driver that the power supply from the battery 35 is stopped.

In step S770, the siren driving circuit 73 determines whether a prescribed time (for example, about 6 seconds) has elapsed since the alarm was output. When the prescribed time has not elapsed (NO in step S770), the process returns to step S760, and the output of the alarm from the piezo speaker 62 is continued. Here, the user can optionally set the prescribed time. On the other hand, when it is determined in step S770 that the prescribed time has elapsed (YES in step S770), the siren driving circuit 73 stops outputting an alarm from the piezo speaker 62 (step S780), and ends the process.

(Modifications)

Note that, in the present embodiment, the configuration in which the alarm device 40 and the notification control device 30 are connected via the LIN is described, but the alarm device 40 may be provided as an internal configuration of the notification control device 30.

In addition, the control circuit 72 of the alarm device 40 determines whether the vehicle is in a stopped state based on the speed information about the vehicle included in the received control information, and stops the output of the alarm instruction signal to suppress the output of the alarm when the vehicle is in the stopped state.

In addition, the notification control device 30 outputs control information including operation information acquired from the controller 1 functioning as a vehicle control apparatus to the alarm device 40, and the alarm device 40 outputs an alarm when the output of the control information from the notification control device 30 is stopped.

Summary of Embodiments

The above embodiments disclose at least the following driving assistance device, the vehicle including the driving assistance device, and the driving assistance method of the driving assistance device.

Configuration 1. A driving assistance device of a vehicle having a driving assistance function, the driving assistance device comprising:

an information display unit (5) configured to display travel information based on the driving assistance function based on a power supply from a power source (35) mounted on the vehicle;

an information notification unit (31) provided on a steering wheel of the vehicle and configured to make a notification of an operation state of the driving assistance function by turning on or off;

a notification control unit (30) configured to operate based on a power supply from the power source (35) and control the notification based on operation information indicating the operation state of the driving assistance function; and an alarm unit (40) connected to the notification control unit (30) via a communication unit (LIN) and capable of outputting an alarm based on power of an internal power source (65) different from the power source (35), wherein when a power supply from the power source is stopped, the alarm unit (40) outputs the alarm based on the power of the internal power source (65).

According to the driving assistance device of the configuration 1, even in a situation where the power supply from the battery mounted on the vehicle is stopped, it is possible to make a notification of the transfer of authority related to the vehicle control and the surrounding monitoring by outputting the alarm. In addition, the power of the internal power source enables an alarm to be output even when a battery fails.

Configuration 2. When the power supply from the power source (35) is stopped, the information display unit (5) turns off display of the travel information, and the information notification unit (31) turns off the notification.

According to the driving assistance device of the configuration 2, even in a situation where the power supply from the battery mounted on the vehicle is stopped, it is possible to make a notification that the power supply is stopped by turning off the display, and it is possible to make a notification of the transfer of authority related to the vehicle control and the surrounding monitoring.

Configuration 3. The notification control unit (30)

transmits, via the communication unit (LIN), to the alarm unit, control information including at least one of a request for a power state of the internal power source, a request for state information indicating whether an alarm is output from the alarm unit (40), an output start instruction of the alarm, a stop instruction of the alarm, speed information about the vehicle, operation information indicating an operation state of the driving assistance function, and alarm instruction information for operating the alarm unit (40) when a power supply from the power source (35) is stopped, and the alarm unit (40)

transmits, via the communication unit (LIN), to the notification control unit (30), state information including an output state of the alarm and an internal power source state indicating power that is capable of being output from the internal power source (65).

According to the driving assistance device of the configuration 3, by sharing the control information and the state information by mutual communication, even in a situation where the power supply from the battery mounted on the vehicle is stopped, the alarm device can make a notification of the transfer of authority related to the vehicle control and the surrounding monitoring by outputting the alarm using the information acquired in the previous communication.

Configuration 4. The alarm unit (40) shifts to a warning state in which an alarm is capable of being output when the driving assistance function is an operation state by determination based on the operation information.

According to the driving assistance device of the configuration 4, when the driving assistance function (extended assistance mode) is in the operation state, the state shifts to the warning state, whereby an alarm can be promptly output when the power supply from the battery is stopped.

Configuration 5. The alarm unit (40) determines, based on speed information about the vehicle, whether the vehicle is in a stopped state, and suppresses an output of the alarm when the vehicle is in the stopped state.

According to the driving assistance device of the configuration 5, it is possible to suppress the output of the alarm when the notification of the transfer of authority related to the vehicle control and the surrounding monitoring is unnecessary as in the case where the vehicle is in the stopped state.

Configuration 6. The notification control unit (30) is connected to a vehicle control apparatus (1) responsible for the driving assistance function via a communication unit (CAN) different from the communication unit (LIN), the notification control unit (30) transmits, to the vehicle control apparatus (1), the internal power source state acquired from the alarm unit (40), and the vehicle control apparatus (1) determines whether to provide the driving assistance function based on the internal power source state.

According to the driving assistance device of the configuration 6, it is possible to determine whether to provide the extended assistance mode or the normal assistance mode based on the internal power source state of the alarm device. For example, in a case where the internal power source state is a state where the predetermined amount of power is less than a threshold value, it is possible to restrict the provision of the extended assistance mode and suppress in advance the provision of functions that require notification of transfer of authority regarding vehicle control and surrounding monitoring.

Configuration 7. The vehicle control apparatus (1) outputs, to the notification control unit (30), operation information indicating the operation state of the driving assistance function, and the alarm unit (40) outputs the alarm when an output of the control information is stopped.

According to the driving assistance device of the configuration 7, even in a situation where the output of the control information is stopped, it is possible to make a notification of the transfer of authority related to the vehicle control and the surrounding monitoring by the output of the alarm.

Configuration 8. The alarm unit (40) issues the alarm by outputting a notification sound.

According to the driving assistance device of the configuration 8, even in a situation where the power supply from the battery mounted on the vehicle is stopped, it is possible to make a notification of the transfer of authority related to the vehicle control and the surrounding monitoring by outputting the notification sound. In addition, the power of the internal power source enables an alarm to be output even when a battery fails.

Configuration 9. A vehicle (1) having a driving assistance function, comprising: the driving assistance device according to any one of Configurations 1 to 8.

According to the vehicle of the configuration 9, even in a situation where the power supply from a battery mounted on the vehicle is stopped, it is possible to provide a vehicle having a driving assistance function capable of making a notification of the transfer of authority regarding vehicle control and surrounding monitoring by outputting an alarm.

Configuration 10. A driving assistance method comprises:

displaying travel information based on the driving assistance function based on a power supply from a power source mounted on a vehicle having a driving assistance function;

making a notification of an operation state of the driving assistance function by turning on or off;

operating based on a power supply from the power source and controlling the notification based on operation information indicating an operation state of the driving assistance function;

outputting an alarm based on power of an internal power source different from the power source; and when a power supply from the power source is stopped, outputting the alarm based on the power of the internal power source.

According to the driving assistance method of the configuration 10, even in a situation where the power supply from the battery mounted on the vehicle is stopped, it is possible to make a notification of the transfer of authority related to the vehicle control and the surrounding monitoring by outputting the alarm. In addition, the power of the internal power source enables an alarm to be output even when a battery fails.

Another Embodiment

In the present invention, a program for realizing the functions of the above-described embodiments can be provided to a system or a driving assistance device constituting the system via a network or a storage medium, and one or more processors in a computer of the driving assistance device can read the program to execute processing of the driving assistance device.

The invention is not limited to the foregoing embodiments, and various variations/changes are possible within the spirit of the invention.

What is claimed is:

1. A driving assistance device of a vehicle having a driving assistance function, the driving assistance device comprising:

an information display unit configured to display travel information based on the driving assistance function based on a power supply from a power source mounted on the vehicle;

an information notification unit provided on a steering wheel of the vehicle and configured to make a notification of an operation state of the driving assistance function by turning on or off;

a notification control unit configured to operate based on a power supply from the power source and control the notification based on operation information indicating the operation state of the driving assistance function; and an alarm unit connected to the notification control unit via a communication unit and capable of outputting an alarm based on power of an internal power source different from the power source, wherein when a power supply from the power source is stopped, the alarm unit outputs the alarm based on the power of the internal power source, and when the power supply from the power source is stopped, the information display unit turns off display of the travel information, and the information notification unit turns off the notification.

2. The driving assistance device according to claim 1, wherein the alarm unit issues the alarm by outputting a notification sound.

3. A driving assistance device of a vehicle having a driving assistance function, the driving assistance device comprising:

an information display unit configured to display travel information based on the driving assistance function based on a power supply from a power source mounted on the vehicle;

an information notification unit provided on a steering wheel of the vehicle and configured to make a notification of an operation state of the driving assistance function by turning on or off;

a notification control unit configured to operate based on a power supply from the power source and control the notification based on operation information indicating the operation state of the driving assistance function; and an alarm unit connected to the notification control unit via a communication unit and capable of outputting an alarm based on power of an internal power source different from the power source, wherein when a power supply from the power source is stopped, the alarm unit outputs the alarm based on the power of the internal power source, and wherein the notification control unit transmits, via the communication unit, to the alarm unit, control information including at least one of a request for a power state of the internal power source, a request for state information indicating whether an alarm is output from the alarm unit, an output start instruction of the alarm, a stop instruction of the alarm, speed information about the vehicle, operation information indicating an operation state of the driving assistance function, and alarm instruction information for operating the alarm unit when a power supply from the power source is stopped, and the alarm unit transmits, via the communication unit, to the notification control unit, state information including an output state of the alarm and an internal power source state indicating power that is capable of being output from the internal power source.

4. The driving assistance device according to claim 3, wherein the alarm unit shifts to a warning state in which an alarm is capable of being output when the driving assistance function is an operation state determined based on the operation information.

5. The driving assistance device according to claim 3, wherein the alarm unit determines, based on speed information about the vehicle, whether the vehicle is in a stopped state, and suppresses an output of the alarm when the vehicle is in the stopped state.

6. The driving assistance device according to claim 3, wherein the notification control unit is connected to a vehicle control apparatus responsible for the driving assistance function via a communication unit different from the communication unit, the notification control unit transmits, to the vehicle control apparatus, the internal power source state acquired from the alarm unit, and the vehicle control apparatus determines whether to provide the driving assistance function based on the internal power source state.

7. The driving assistance device according to claim 6, wherein the vehicle control apparatus outputs, to the notification control unit, operation information indicating the operation state of the driving assistance function, and wherein the alarm unit outputs the alarm when an output of the control information is stopped.

8. A vehicle having a driving assistance function, comprising:

the driving assistance device according to claim 1.

9. A driving assistance method of a vehicle having a driving assistance function, the method comprising:

displaying travel information based on the driving assistance function based on a power supply from a power source mounted on the vehicle;

making a notification of an operation state of the driving assistance function by turning on or off;

operating based on a power supply from the power source and controlling the notification based on operation information indicating an operation state of the driving assistance function;

outputting an alarm based on power of an internal power source different from the power source; and when a power supply from the power source is stopped, outputting the alarm based on the power of the internal power source, and when the power supply from the power source is stopped, turning off display of the travel information, and turning off the notification.

* * * * *